(12) United States Patent
Song

(10) Patent No.: US 9,049,425 B2
(45) Date of Patent: Jun. 2, 2015

(54) STEREOSCOPIC IMAGE PROCESSING METHOD AND SYSTEM

(71) Applicant: SuperD Co. Ltd., Shenzhen (CN)

(72) Inventor: Lei Song, Shenzhen (CN)

(73) Assignee: SUPERD CO., LTD., Shenzhen (CN)

( * ) Notice: Subject to any disclaimer, the term of this patent is extended or adjusted under 35 U.S.C. 154(b) by 488 days.

(21) Appl. No.: 13/629,538

(22) Filed: Sep. 27, 2012

(65) Prior Publication Data
US 2013/0076875 A1    Mar. 28, 2013

(30) Foreign Application Priority Data

Sep. 28, 2011 (CN) .......................... 2011 1 0301873

(51) Int. Cl.
H04N 13/04    (2006.01)
H04N 13/00    (2006.01)

(52) U.S. Cl.
CPC ................................. H04N 13/0022 (2013.01)

(58) Field of Classification Search
CPC ................................................ H04N 13/0022
USPC ........................................................ 348/51
See application file for complete search history.

(56) References Cited

U.S. PATENT DOCUMENTS

| 2003/0112503 | A1* | 6/2003 | Lantin | 359/376 |
|---|---|---|---|---|
| 2006/0170674 | A1* | 8/2006 | Tsubaki et al. | 345/419 |
| 2010/0021141 | A1* | 1/2010 | Yamashita et al. | 386/109 |
| 2011/0018968 | A1* | 1/2011 | Shikata et al. | 348/47 |
| 2011/0033170 | A1* | 2/2011 | Ikeda et al. | 386/244 |
| 2011/0129198 | A1* | 6/2011 | Toma et al. | 386/239 |
| 2011/0149050 | A1* | 6/2011 | Imada | 348/51 |
| 2011/0187817 | A1* | 8/2011 | Sasaki et al. | 348/42 |
| 2011/0211042 | A1* | 9/2011 | Thorpe et al. | 348/43 |
| 2012/0019532 | A1* | 1/2012 | Yanagita et al. | 345/419 |
| 2012/0069004 | A1* | 3/2012 | Takama et al. | 345/419 |
| 2012/0213492 | A1* | 8/2012 | Takeuchi | 386/244 |

* cited by examiner

Primary Examiner — Christopher S Kelley
Assistant Examiner — Asmamaw G Tarko
(74) Attorney, Agent, or Firm — Anova Law Group, PLLC

(57) ABSTRACT

A method is provided for a three-dimensional (3D) image processing system including a stereoscopic display device. The method includes providing a stereoscopic image and obtaining a parallax range of the stereoscopic image and a parallax range supported by the stereoscopic display device. The method also includes determining a parallax operation to adjust the parallax range of the stereoscopic image based on the relationship between the parallax range of the stereoscopic image and the parallax range supported by the stereoscopic display device. Further, the method includes determining an offset value and an offset direction of a horizontal coordinate of each pixel of the stereoscopic image, and shifting the horizontal coordinate of each pixel of the stereoscopic image by the offset value and in the offset direction.

18 Claims, 7 Drawing Sheets

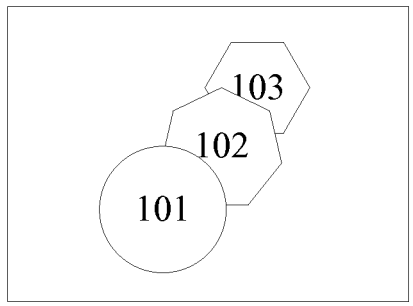 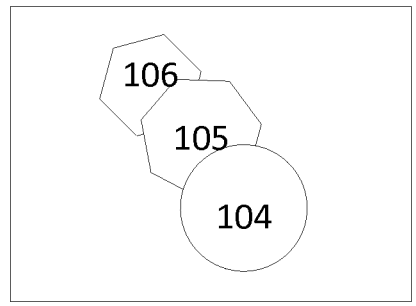
FIG. 1A  FIG. 1B
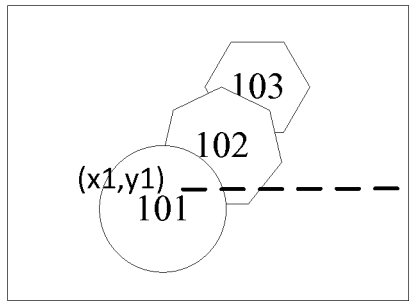 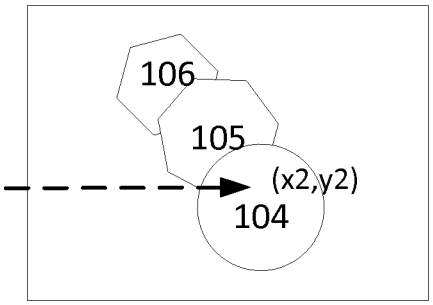
FIG. 2A  FIG. 2B
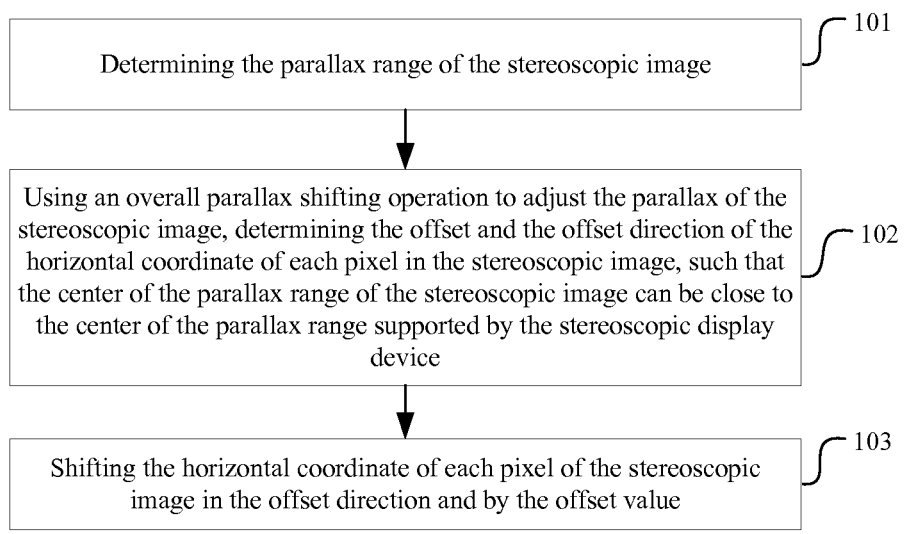
FIG. 3

STEREOSCOPIC IMAGE PROCESSING METHOD AND SYSTEM

CROSS-REFERENCES TO RELATED APPLICATIONS

This application claims the priority of Chinese patent application number 201110301873.2, filed on Sep. 28, 2011, the entire contents of which are incorporated herein by reference.

FIELD OF THE INVENTION

The present invention generally relates to image processing technologies and, more particularly, to 3D image processing methods and systems.

BACKGROUND

Stereoscopic display technologies have been rapidly developed and recognized by more and more users. The most common types of stereoscopic displays are glasses-based stereoscopic display and naked-eye stereoscopic display. The glasses type stereoscopic display is generally used in movie theaters or on home television equipment, while the naked-eye type stereoscopic display is generally used in laptops, tablet PCs, mobile phones and other mobile devices.

Many contents displayed on stereoscopic display devices for individual consumers generally contain two sets of images having certain parallax, so-called stereoscopic images. Two images forming a stereoscopic image are referred as the left image and the right image, respectively.

For example, FIGS. 1A and 1B show the left image and the right image of a stereoscopic image. As shown in FIGS. 1A and 1B, there are three objects in each image, the first object 101/104 (101 for the object in the left image, and 104 for the same object in the right image), the second object 102/105, and the third object 103/106. These three objects each may have a different parallax. For example, the first object has a positive parallax, and appears closer to the viewer and projecting out of the display screen. The second object 102 may have a zero parallax and is rendered on the display screen. The third object may have a negative parallax, which appears farther to the viewer and recessed from the display screen.

Because the left image (L) and the right image (R) of the stereoscopic image can be placed out of order, the parallax between them may change sign accordingly. By comparing all pixels of the left image and the right image, the parallax of each pixel can be obtained, including a maximum value of the positive parallax, called the maximum positive parallax, and a minimum value of the negative parallax, called the minimum negative parallax. The range set by the maximum positive parallax and the minimum negative parallax defines the parallax range of the stereoscopic image.

For a stereoscopic display device, after the hardware design of the device is fixed, the parallax characteristics of the stereoscopic display device may also be fixed. Such parallax characteristics includes a supported parallax range (i.e., the stereoscopic display device supports a range limited by the supported maximum positive parallax and the supported minimum negative parallax). The supported maximum positive parallax and minimum negative parallax refer to allowable maximum positive parallax and minimum negative parallax between image pixels when the stereoscopic display device displays the stereoscopic image normally. The parallax range supported by a stereoscopic display device reflects the parallax performance capability of the stereoscopic display device.

Currently, the parallax information may be fixed after the stereoscopic images are generated. However, the relationship between the parallax range of the stereoscopic images and the parallax range supported by the stereoscopic display device may be unmatched and may affect the 3D display effects and viewer's 3D viewing experience. The disclosed methods and systems are directed to solve one or more problems set forth above and other problems.

BRIEF SUMMARY OF THE DISCLOSURE

One aspect of the present disclosure includes a method for a three-dimensional (3D) image processing system including a stereoscopic display device. The method includes providing a stereoscopic image and obtaining a parallax range of the stereoscopic image and a parallax range supported by the stereoscopic display device. The method also includes determining a parallax operation to adjust the parallax range of the stereoscopic image based on the relationship between the parallax range of the stereoscopic image and the parallax range supported by the stereoscopic display device. Further, the method includes determining an offset value and an offset direction of a horizontal coordinate of each pixel of the stereoscopic image, and shifting the horizontal coordinate of each pixel of the stereoscopic image by the offset value and in the offset direction.

Another aspect of the present disclosure includes a 3D image processing system. The 3D image processing system includes an image source configured to provide a stereoscopic image, a stereoscopic display device, and an obtaining unit configured to obtain a parallax range of the stereoscopic image and a parallax range supported by the stereoscopic display device. The system also includes an offset parameter determining unit configured to determine an offset value and an offset direction of a horizontal coordinate of each pixel of the stereoscopic image, when a parallax operation is determined to adjust the parallax range of the stereoscopic image based on the relationship between the parallax range of the stereoscopic image and the parallax range supported by the stereoscopic display device. The system also includes a shifting unit configured to shift the horizontal coordinate of each pixel of the stereoscopic image by the offset value and in the offset direction.

Other aspects of the present disclosure can be understood by those skilled in the art in light of the description, the claims, and the drawings of the present disclosure.

BRIEF DESCRIPTION OF THE DRAWINGS

FIGS. 1A and 1B show a left image and a right image of a stereoscopic image;

FIGS. 2A and 2B illustrates objects in a left image and a right image of a stereoscopic image;

FIG. 3 illustrates an exemplary 3D image processing process to adjust a parallax distribution consistent with the disclosed embodiments;

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 11:
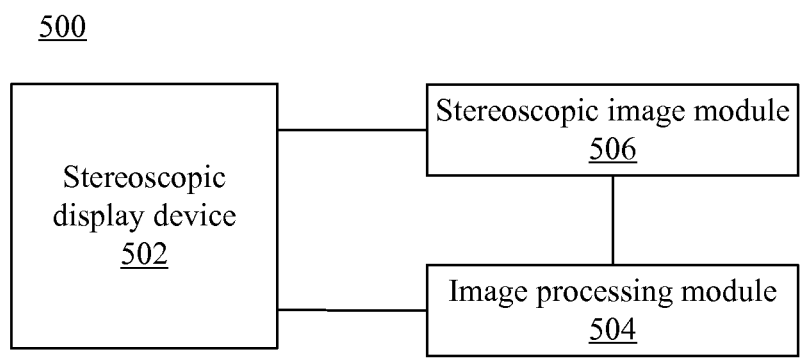
FIG. 11 illustrates an exemplary 3D image processing system consistent with the disclosed embodiments.

FIG. 11 illustrates an exemplary 3D image processing system 500. As shown in FIG. 11, the 3D image processing system 500 includes a stereoscopic display device 502, an image processing module 504, and a stereoscopic image module 506. Other modules may also be included.

The 3D image processing system 500 may include any appropriate device with certain 3D display capability, such as computers, TVs, tablets, smart phones and other mobile devices, etc. The stereoscopic display device 502 may include any appropriate type of stereoscopic display screen based on plasma display panel (PDP) display, field emission display (FED), cathode ray tube (CRT) display, liquid crystal display (LCD), organic light emitting diode (OLED) display, or other types of displays. Further, the stereoscopic display device 502 may also be touch-sensitive, i.e., a touch screen. Other display types may also be used.

The image processing module 504 may be configured to control operation of the 3D image processing system 500, such as the control module and/or digital signal processing module in a computer, TV, tablet, smart phone, or other mobile device. The image processing module 504 may include any appropriate devices, such as a processor together with other devices such as random access memory (RAM), read-only memory (ROM), input/output interfaces, sensor driving circuitry, communication interfaces, and storage/database, etc. During operation, computer programs stored in the memory or other storage devices may be executed by the processor to perform certain control and image processing functions and processes and/or to implement certain functional modules.

The stereoscopic image module 506 may include any appropriate devices to provide source of stereoscopic images, such as stereoscopic videos, pictures, and other contents. The image processing module 504 and/or the stereoscopic image module 506 may coincide with the stereoscopic display device 502.

During operation, the image processing module 504 may perform certain processes to adjust parallax parameters of the stereoscopic images to improve 3D display effects of the stereoscopic display device 502.

For convenience, configurations shown in FIGS. 2A and 2B are used throughout the disclosure to illustrate various parallax relationships. As shown in FIGS. 2A and 2B, there are three objects in each image, the first object 101/104 (101 for the object in the left image, and 104 for the same object in the right image), the second object 102/105, and the third object 103/106.

The horizontal axis points to the right direction when facing the stereoscopic images, and the coordinates may be determined using the same coordinate origin as the display screen (e.g., coordinate origin point for a PC is generally the upper left corner). The parallax of the objects may then be determined using corresponding coordinates. For example, the horizontal parallax between points (x1, y1) and (x2, y2) of the first object 101/104 is Dh=x2−x1, the vertical parallax Dv=y2−y1. Because the human eyes are arranged horizontally, it may be assumed that only horizontal parallax needs to be considered. That is, Dv=0.

Under certain circumstances, the parallax range of a stereoscopic image and the parallax range supported by the stereoscopic display device may be different. For example, the maximum positive parallax M' of the stereoscopic image may be greater than the maximum positive parallax M supported by the stereoscopic display device, and the minimum negative parallax N' of the stereoscopic image may also be greater than the minimum negative parallax N supported by the stereoscopic display device. Thus, when the stereoscopic display device displays the stereoscopic image, the stereoscopic display device may be unable to display the maximum positive parallax M' of the stereoscopic image.

When this happens, it may indicate that, because the center of the parallax range of the stereoscopic image is away from the center of the parallax range of the stereoscopic display device, and the parallax range of the stereoscopic image is not evenly distributed over the parallax range of the stereoscopic display device. That is, the distance between the center of the parallax range of the stereoscopic image and the center of the parallax range of the stereoscopic display device is relatively large. In such case, the parallax range of the stereoscopic image is not evenly distributed along the center of the parallax range of the stereoscopic display device, and the parallax performance capacity of the stereoscopic display device may be underutilized.

FIG. 3 illustrates an exemplary 3D image processing process to adjust the parallax distribution between the stereoscopic image and the stereoscopic display device. That is, by adjusting the parallax, the parallax of all pixels of the stereoscopic image can be shifted entirely (i.e., the horizontal coordinates of all pixels of the stereoscopic image have the same shifting direction and shifting value). The 3D display effects may then be improved.

As shown in FIG. 3, at the beginning of the process, the parallax range of a stereoscopic image is obtained (101). The stereoscopic image data may contain certain parallax information of the stereoscopic image. Such parallax information may be directly used to obtain the parallax range of the stereoscopic image, i.e., the maximum positive parallax M' and the minimum negative parallax N' of the stereoscopic image.

If such parallax information is not present or cannot be obtained, the parallax of each pixel of the stereoscopic image can be calculated by comparing the difference of each pixel from the stereoscopic image. The maximum positive parallax M' and the minimum negative parallax N' of the stereoscopic image may then be determined. Pixel parallax calculation often considers two aspects: one is matching constraint, and the other is smoothness constraint. Implementation of these two types of constraints may be different based on particular application.

After determining the parallax range of the stereoscopic image (101), the parallax of the entire stereoscopic image is adjusted (102). For example, an overall parallax shifting operation may be used to adjust the parallax of the stereoscopic image. More specifically, the offset and the offset direction of the horizontal coordinate of each pixel in the stereoscopic image is determined, so that the center of the parallax range of the stereoscopic image can be close to the center of the parallax range supported by the stereoscopic display device.

The center of the parallax range may be determined as the half of the total of the maximum positive parallax and the minimum negative parallax. For stereoscopic images, the center of the parallax range is (M'+N')/2; while, for the stereoscopic display devices, the center of the supported parallax range is (M+N)/2.

Such parallax adjustment may be performed unconditionally. Alternatively, to reduce the amount of calculation needed for the parallax adjustment processing, the overall parallax shifting operation may be performed when a first condition is satisfied. The first condition may includes one and more of the followings:

(a) The parallax range of the stereoscopic image exceeds the parallax range supported by the stereoscopic display device. That is, M'>M, N'<N, or both are satisfied. The parallax range supported by the stereoscopic display device may be parameters configured in the 3D image processing system or read by the image processing system.

(b) The distance between the center of the parallax range of the stereoscopic image and the center of the parallax range supported by the stereoscopic display device is greater than a predetermined threshold value. The threshold value may be set based on the type of the stereoscopic display device or based on any other considerations, such as empirical values. The threshold value may also be adjusted in real-time based on actual display effects.

On the other hand, if the first condition is not satisfied, the parallax adjustment may be unnecessary to be performed, and other processing may be performed.

Such overall parallax shifting operation in general may reduce the distance between the center of the parallax range of the stereoscopic image and the center of the parallax range supported by the stereoscopic display device, i.e., the absolute value of the difference between two centers. This means that the overall parallax of the stereoscopic image is distributed more evenly with respect to the center of the parallax range supported by the stereoscopic display device, which may avoid the situation where one end of the parallax range is out-of-scope, while the other end of the parallax range is not fully utilized.

Shifting the horizontal coordinate of the pixel is equivalent to adjusting the parallax of the pixel, and the offset value determines the amount of the parallax adjustment. The offset value may be determined for each pixel in the stereoscopic image. For example, the offset value $X_{offset}$ may be determined based on:

$$X_{offset}=k_1(M-M')+k_2(N-N') \quad (1)$$

Where $k_1$ and $k_2$ represent the weight of the positive parallax and the weight of the negative parallax, respectively, and $k_1+k_2=1$. More specifically, to make the center of the parallax range of the stereoscopic image coincide with the center of the parallax range supported by the stereoscopic display device, the values for $k_1$ and $k_2$ may be assigned as: $k_1=k_2=0.5$. Other offset value may also be used. For example, if the maximum positive parallax of the stereoscopic image exceeds the maximum positive parallax supported by the stereoscopic display device by a certain value, the certain value may be used as $X_{offset}$.

Further, a shifting operation is performed to shift the horizontal coordinate of each pixel of the stereoscopic image in the offset direction and by the offset value (103). The shifting operation may be performed selectively. For example, the shifting operation may be performed on pixels of the left image only or the right image only, or may be performed on both the left image and the right image at the same time.

More specifically, in one embodiment, the horizontal coordinate of each pixel of the left image is shifted toward the left by $X_{offset}$, i.e., when $X_{offset}$ is positive, the shift direction is to the left, and when $X_{offset}$ is negative, the shift direction is to the right. In another embodiment, the horizontal coordinate of each pixel of the right image is shifted toward the right by $X_{offset}$, i.e., when $X_{offset}$ is positive, the shift direction is to the right, and when $X_{offset}$ is negative, the shift direction is to the left.

In certain other embodiments, the horizontal coordinate of each pixel in the left image can be shifted toward the left by $X_{offset1}$, while the horizontal coordinate of each pixel in the right image is shifted toward the right by $X_{offset2}$ simultaneously. The offsets also satisfy the condition of $X_{offset1}+X_{offset2}=X_{offset}$. Thus, only shifting pixels on the left image or pixels on the right image may be treated as special cases where $X_{offset2}=0$ or $X_{offset1}=0$.

After the shifting operation on the horizontal coordinates of the pixels of the stereoscopic image, the parallax of the adjusted stereoscopic image has changed i.e., adjustment on the parallax of the stereoscopic image is achieved.

It should be noted that Equation (1) above may be rewritten as $X_{offset}=(k_1(M'-M)+k_2(N'-N))/2$, i.e., the $X_{offset}$ has an opposite sign to the one in Equation (1). Thus, in 103, the horizontal coordinate of each pixel of the left image is shifted to the right by $X_{offset}$, or the horizontal coordinate of each pixel in the right image is shifted to the left by $X_{offset}$. Other methods may also be used.

The 3D display effects may be improved by such parallax adjustment. According to the characteristics of human eyes, there may be two major factors affecting the 3D effect, convergence and separation (i.e., left camera and right camera spacing). The overall shifting of the parallax may be equivalent to moving the convergence back and forth during image taking, the amount of change on the positive parallax and the amount of change on the negative parallax are the same.

Figure 4A:
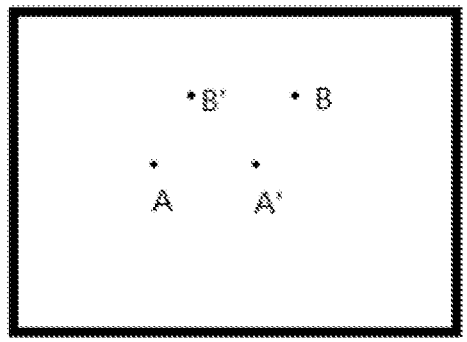
FIGS. 4A and 4B illustrate a parallax shifting operation consistent with the disclosed embodiments.
Figure 4B:
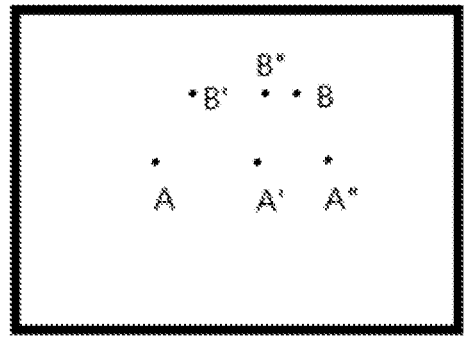

As shown in FIG. 4A and FIG. 4B, assuming that the pixel A in the left image has a positive parallax AA', and the pixel B has a negative parallax BB', when the above-described shift operation is performed on the right image, the pixel A now has a positive parallax AA", and the pixel B now has a negative parallax BB". However, the offsets of the pixels (A'A" and B'B") are the same. Thus, corresponding to the 3D display effects, the 3D images are moved entirely back and/or forth.

Thus, with such parallax processing, when the parallax range of the stereoscopic images is less than or equal to the parallax range of the stereoscopic display device, i.e., (M'-N')≤(M-N), the parallax range of the stereoscopic image can be adjusted to fall into the parallax range of the stereoscopic display device (including coincident parallax ranges), i.e., M'≤M, and N'≥N. Even if the parallax range of the stereoscopic images is greater than the parallax range of the stereoscopic display device, such processing can make the two parallax ranges overlapping more evenly.

Figure 5:
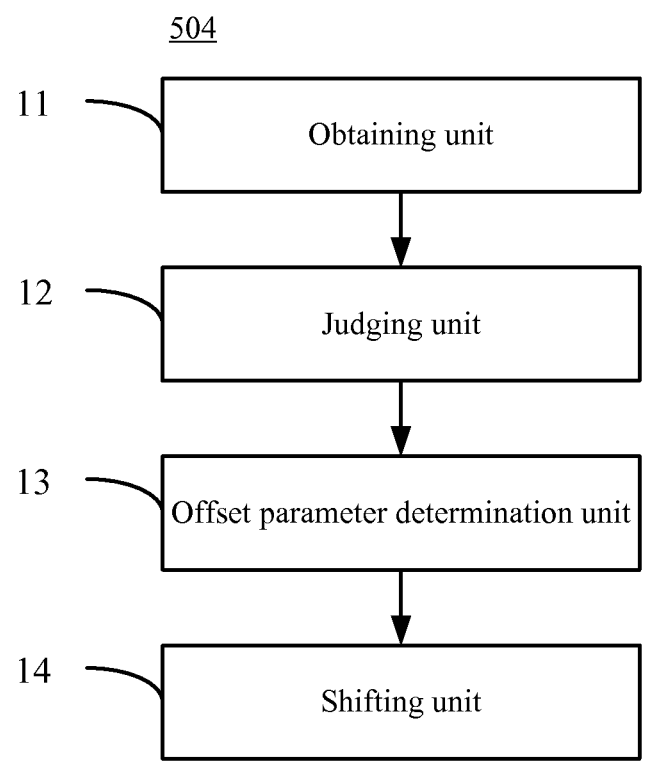
FIG. 5 illustrates an exemplary image processing module consistent with the disclosed embodiments.

FIG. 5 illustrates an exemplary image processing module 504 consistent with the disclosed embodiments. As shown in FIG. 5, the image processing module 504 includes an obtaining unit 11, a judging unit 12, an offset parameter determining unit 13, and a shifting unit 14. Other units may also be included.

The obtaining unit 11 may be configured to obtain a parallax range of the stereoscopic image. The judging unit 12 is configured to determine whether a first condition for adjusting the parallax of the stereoscopic image by overall shifting is satisfied. If the first condition is satisfied, the judging unit 12 activates the offset parameter determination unit 13. Of course, if the first condition is not judged, the judging unit 12 may be optional.

The offset parameter determination unit 13 is configured to determine an offset direction and offset value of the horizontal coordinate of each pixel, when the parallax of the stereoscopic image is adjusted by shifting the overall or entire image, such that distance between the center of the parallax range of the stereoscopic image and the center of the parallax range of the stereoscopic display device can be reduced. Further, the shifting unit 14 is configured to shift the horizontal coordinate of each pixel on the image by the offset value and in the offset direction.

Under certain circumstances, the parallax range of the stereoscopic image is greater than the parallax range supported by the stereoscopic display device, i.e., (M'−N')>(M−N). Thus, the stereoscopic display device can only display a portion of the parallax of the stereoscopic image. The 3D display effect may be affected, and the parallax performance ability of the stereoscopic display device may be underutilized.

In addition to the supported parallax range, the parallax characteristic information of a stereoscopic display device may also include a desired parallax range (i.e., a parallax range with desired 3D display effects). The desired parallax range of the stereoscopic display device is corresponding to the size, type, and optical design of the stereoscopic display device. The desired parallax range may be determined based on empirical values or may be adjusted based on the actual display effects. Further, the desired parallax range can be determined from the configuration parameters in the 3D image processing system or read by the 3D image processing system.

The desired parallax range may also be derived as a ratio of the parallax range supported by the stereoscopic display device. In one embodiment, assuming that the maximum positive parallax of the desired parallax range of the stereoscopic display device is $M_b$, and the minimum negative parallax of the desired parallax range is $N_b$, $M_b$ and $N_b$ can be in the range of $M_b=M/5\sim M$, and $N_b=N/5\sim N$, such as $M_b=M/2$, and $N_b=N/2$, where M is the maximum positive parallax of the stereoscopic display device and N is the minimum negative parallax of the stereoscopic display device. Of course, in another example, it may also be possible to set $M_b=M$, and $N_b=N$.

Figure 6:
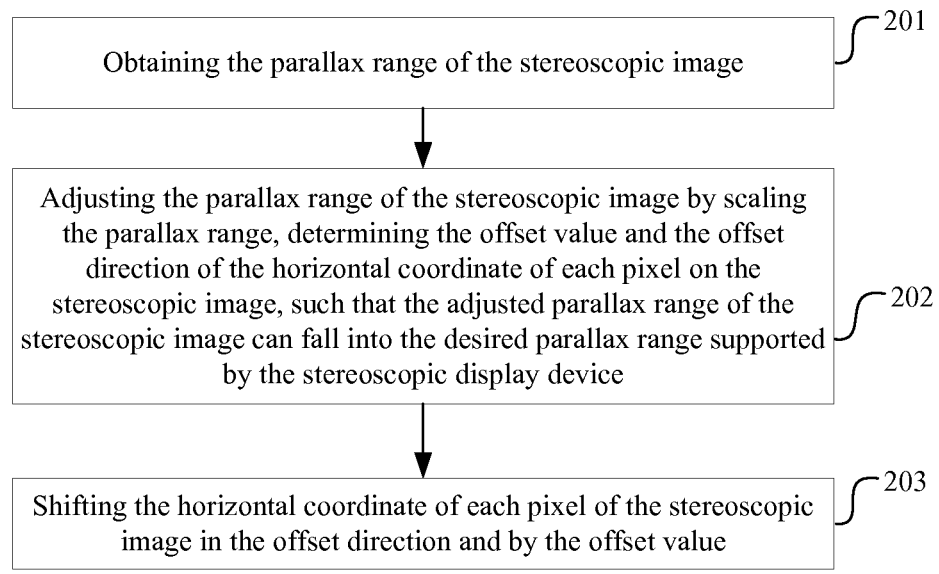
FIG. 6 illustrates another stereoscopic image processing process consistent with the disclosed embodiments.

FIG. 6 illustrates another stereoscopic image processing process consistent with the disclosed embodiments. As shown in FIG. 6, at the beginning, the parallax range of the stereoscopic image is obtained (201).

Further, parallax scaling operation parameters may be determined (202). Specifically, the parallax range of the stereoscopic image may be adjusted by scaling the parallax range upward or downward. That is, a scaling factor is determined to adjust the parallax range of the stereoscopic image. Based on the scaling factor (e.g., increasing or decreasing), the offset value and the offset direction of the horizontal coordinate of each pixel on the stereoscopic image can be determined, so that the adjusted or scaled parallax range of the stereoscopic image can fall into the desired parallax range supported by the stereoscopic display device.

The offset value $X'_{offset}$ of each pixel in the stereoscopic image can be determined according to the following:

$$X'_{offset}=D_h\cdot(1-p), p=\min(M_b/M', N_b/N')$$

where, $D_h$ represents the parallax of the pixel, p represents the minimum of $M_b/M'$ and $N_b/N'$.

Further, a shifting operation is performed to shift the horizontal coordinate of each pixel of the stereoscopic image in the offset direction and by the offset value (203). The shifting operation may be performed selectively. For example, the shifting operation may be performed on pixels of the left image only or the right image only, or may be performed on both the left image and the right image at the same time.

In one embodiment, the horizontal coordinate of each pixel of the left image is shifted toward the right by $X'_{offset}$, i.e., when $X'_{offset}$ is positive, the shift direction is to the right, and when $X'_{offset}$ is negative, the shift direction is to the left. In another embodiment, the horizontal coordinate of each pixel of the right image is shifted toward the left by $X'_{offset}$, i.e., when $X'_{offset}$ is positive, the shift direction is to the left, and when $X'_{offset}$ is negative, the shift direction is to the right.

In certain other embodiments, the horizontal coordinate of each pixel in the left image can be shifted toward the right by $X'_{offset1}$, while the horizontal coordinate of each pixel in the right image is shifted toward the left by $X'_{offset2}$ simultaneously. The offsets also satisfy the condition of $X'_{offset1}+X'_{offset2}=X'_{offset}$. Thus, only shifting pixels on the left image or pixels on the right image may be treated as special cases where $X'_{offset2}=0$ or $X'_{offset1}=0$.

Assuming that the parallax characteristic information of the stereoscopic image satisfies $M_b/M'<N_b/N'$, for a pixel having a maximum positive parallax, the adjusted maximum positive parallax is $D'_h=D_h-D_h\cdot(1-p)=D_h\cdot p$. Because $D_h=M'$, and $p=M_b/M'$, it can be determined that $D'_h=M_b$.

That is, the maximum positive parallax of the stereoscopic image has been adjusted to the maximum positive parallax of the desired parallax range of the stereoscopic display device. At the same time, the minimum negative parallax of the stereoscopic image is also less than the minimum negative parallax of the desired parallax range of the stereoscopic display device. Thus, the adjusted parallax range of the stereoscopic image can fall into the desired parallax range supported by the stereoscopic display device.

If the desired parallax range supported by the stereoscopic display device is used as the parallax range supported by the stereoscopic display device, the adjusted parallax range of the stereoscopic image falls into the parallax range supported by the stereoscopic display device. Further, for the parallax characteristic information of the stereoscopic image satisfying $M_b/M'>N_b/N'$, similar adjustment may also be performed, e.g., the minimum negative parallax of the stereoscopic image is adjusted to the minimum negative parallax of the desired parallax range of the stereoscopic display device.

Such parallax scaling operation on the stereoscopic image corresponds to the 3D display effects of changing the spacing between the left camera and the right camera (or between the viewer's left eye and right eye). After the adjustment, the parallax performance capability of the stereoscopic display device can be fully utilized to display a full range of the parallax of the pixels of the stereoscopic image, and the 3D display effects can be improved.

Figure 7:
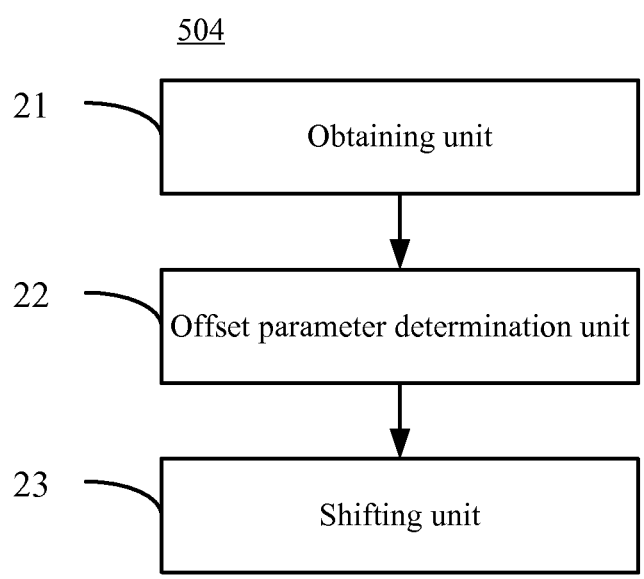
FIG. 7 illustrates another exemplary image processing module consistent with the disclosed embodiments.

FIG. 7 illustrates an exemplary image processing module consistent with the disclosed embodiments. As shown in FIG. 7, the image processing module 504 includes an obtaining unit 21, an offset parameter determination unit 22, and a shifting unit 23. Other units may also be included.

The obtaining unit 11 may be configured to obtain a parallax range of the stereoscopic image. The offset parameter determination unit 22 may be configured to determine the offset value and the offset direction of the horizontal coordinate of each pixel on the stereoscopic image for the parallax scaling operation. Further, the shifting unit 24 is configured to shift the horizontal coordinate of each pixel on the image by the offset value and in the offset direction.

The parallax scaling operation may be performed automatically and/or unconditionally. Alternatively, in certain other embodiment, the parallax scaling operation may be performed after a particular condition is satisfied. For example, if any one or more following conditions are satisfied, the parallax scaling operation may then be performed.

a) the p-value is less than a preset minimum value $P_{min}$;
b) the p-value is greater than a preset maximum value $P_{max}$; and
c) the parallax range of the stereoscopic image exceeds the parallax range supported by the stereoscopic display device, i.e., M'>M and/or N'<N.

The conditions a) and b) may be judged after the p-value is calculated, while the condition c) may be judged prior to determining the offset value. Accordingly, the image processing module may include a judging unit (not shown) to judging the conditions so that the parallax scaling operation can be performed when any of the conditions is satisfied.

Figure 8:
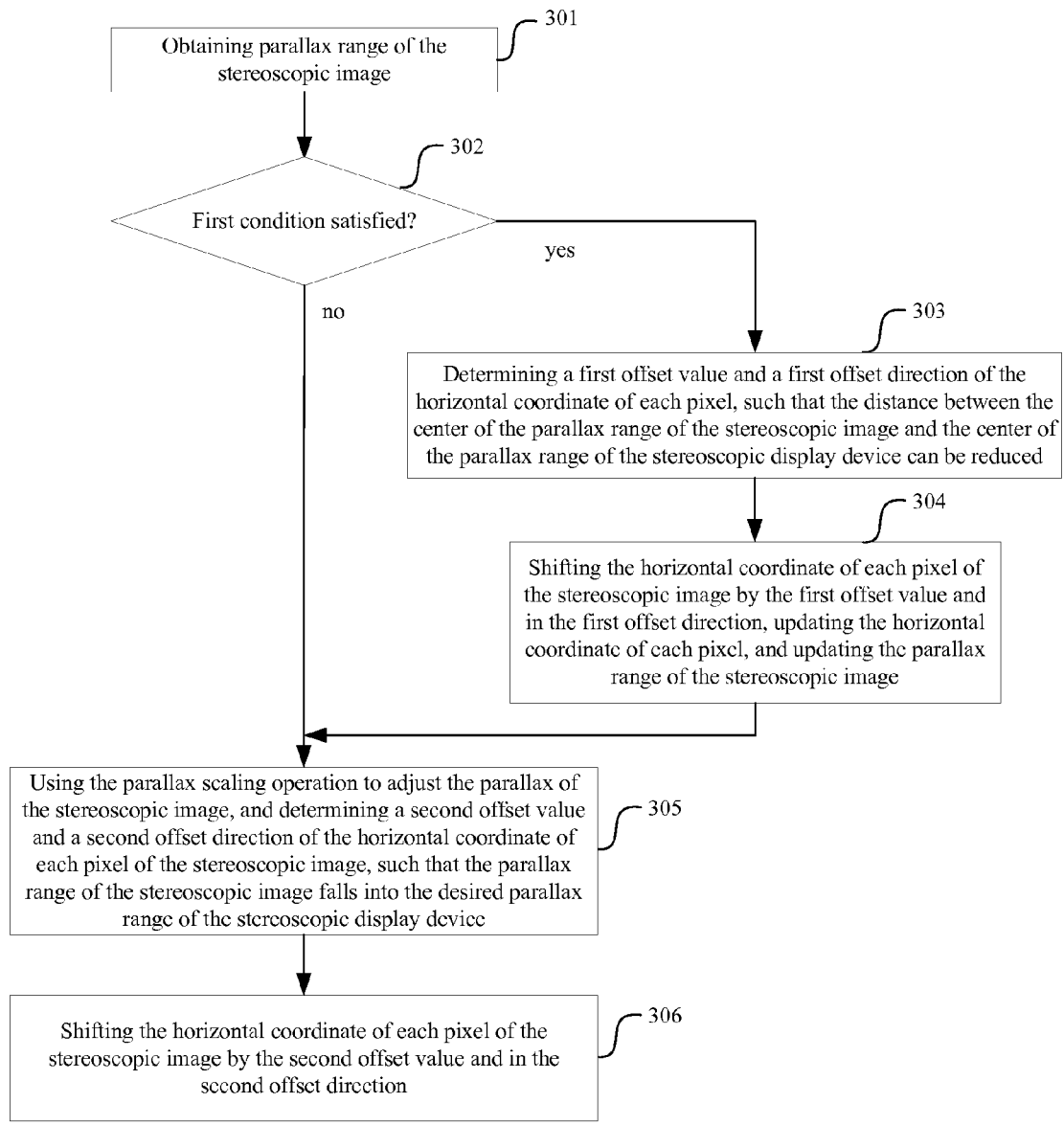
FIG. 8 illustrates an exemplary integrated 3D image processing process consistent with the disclosed embodiments.

However, sometimes the maximum positive parallax of the stereoscopic image and the minimum negative parallax of the stereoscopic image are not evenly related to those of the stereoscopic display device. For example, M' may exceed M by a substantial amount, while N' is within the range of N. If the parallax scaling operation is used to adjust M' to the range of M, N' may also be adjusted by the same scaling factor. Thus, the parallax scaling operation may be integrated with the overall parallax shifting operation. FIG. 8 illustrates an exemplary integrated 3D image processing process consistent with the disclosed embodiments.

As shown in FIG. 8, the parallax range of the stereoscopic image may be obtained (301), and it is determined whether the first condition for the overall parallax shifting operation is satisfied (302).

If the first condition is satisfied (302; yes), it is determined that the overall parallax shifting operation is used to adjust the parallax of the stereoscopic image, and a first offset value and a first offset direction of the horizontal coordinate of each pixel of the stereoscopic image is determined, such that the distance between the center of the parallax range of the stereoscopic image and the center of the parallax range of the stereoscopic display device can be reduced (303).

After the first offset value and the first offset direction are determined, the overall parallax shifting operation is performed on the stereoscopic image (304). That is, the horizontal coordinate of each pixel of the stereoscopic image is shifted by the first offset value and in the first offset direction. The horizontal coordinate of each pixel is updated and the parallax range of the stereoscopic image may also be updated.

On the other hand, if the first condition is not satisfied (302; no), or after the overall parallax shifting operation is completed, it is determined that the parallax scaling operation is used to adjust the parallax of the stereoscopic image, and a second offset value and a second offset direction of the horizontal coordinate of each pixel of the stereoscopic image is determined, such that the parallax range of the stereoscopic image falls into the desired parallax range of the stereoscopic display device (305). The parallax scaling operation may be unconditional or may be conditional, as previously described.

After the second offset value and the second offset direction are determined, the parallax scaling operation is performed on the stereoscopic image (306). That is, the horizontal coordinate of each pixel of the stereoscopic image is shifted by the second offset value and in the second offset direction. The horizontal coordinate of each pixel is updated and the parallax range of the stereoscopic image may also be updated.

Such integrated processing of overall parallax shifting and parallax scaling may be equivalent to simultaneously changing convergence and separation of the left camera and the right camera. For example, the parallax of the stereoscopic image can be adjusted first by the overall parallax shifting operation, such that the parallax range of the stereoscopic image can be evenly distributed with respect to the parallax range supported by the stereoscopic display device. The adjusted parallax range of the stereoscopic image can then be further adjusted by the parallax scaling operation, such that the parallax range of the stereoscopic image falls into the desired parallax range of the stereoscopic display device. The 3D display effects may be further improved.

Figure 9:
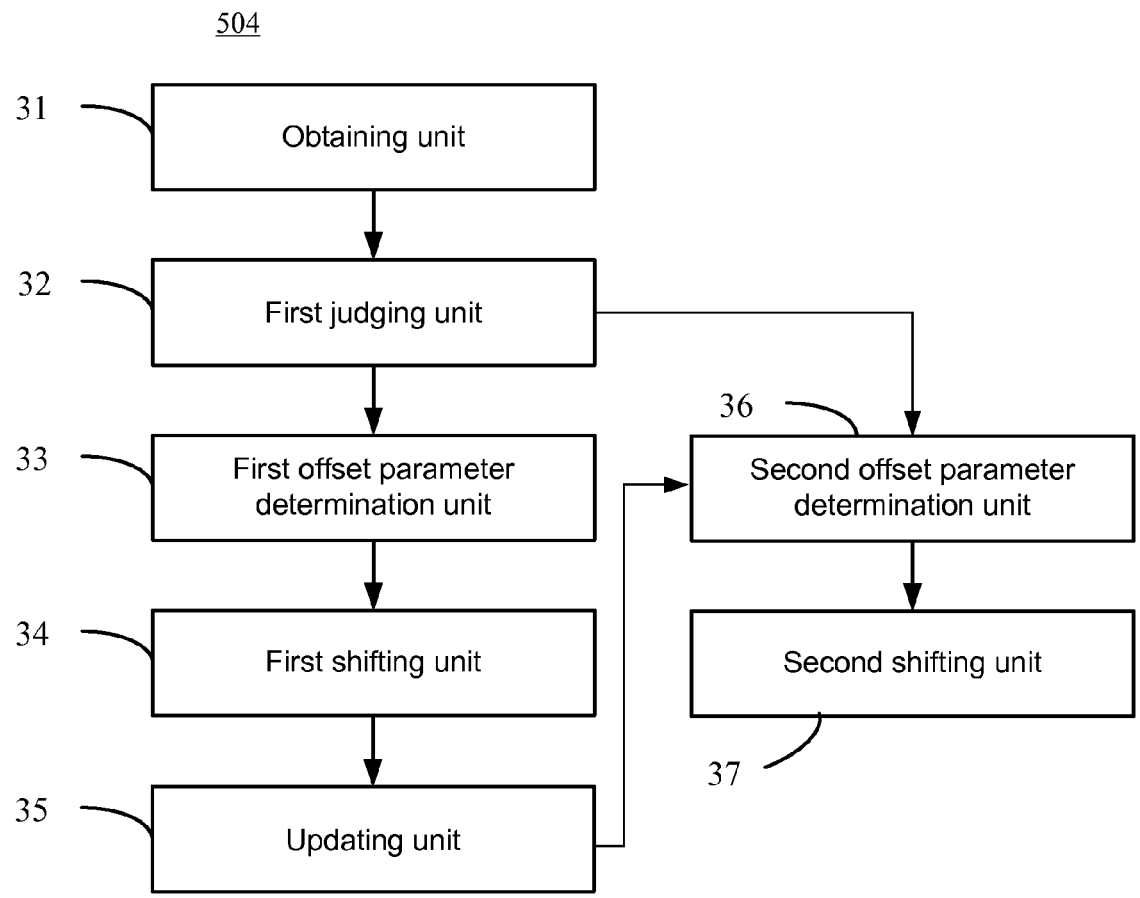
FIG. 9 illustrates another exemplary image processing module consistent with the disclosed embodiments.

FIG. 9 shows an exemplary corresponding image processing module consistent with the disclosed embodiments. As shown in FIG. 9, the image processing module includes an obtaining unit 31, a first judging unit 32, a first offset parameter determination unit 33, a first shifting unit 34, an updating unit 35, a second offset parameter determination unit 36, and a second shifting unit 37. Certain unit(s) may be omitted and other unit(s) may be included.

The obtaining unit 31 is configured to obtain the parallax range of the stereoscopic image. The first judging unit 32 is configured to determine whether the first condition for the overall parallax shifting is satisfied. If the first judging unit 32 determines that the first condition is satisfied, it may activate the first offset parameter determining unit 33. Otherwise, it may activate the second offset parameter determination unit 36.

The first offset parameter determination unit 33 is configured to determine the offset direction and the offset value of the horizontal coordinate of each pixel of the stereoscopic image for the overall parallax shifting operation, such that the distance between the center of the parallax range of stereoscopic image and the center of parallax range supported by the stereoscopic display device is reduced.

Further, the first shifting unit 34 is configured to shift the horizontal coordinate of each pixel of the stereoscopic image by the first offset value and in the first offset direction. The update unit 35 is configured to update the horizontal coordinate of each pixel and the parallax range of the stereoscopic image and, based on the updated parallax range, to activate the second offset parameter determination unit 36.

The second offset parameter determination unit 36 is configured to determine the second offset value and the second offset direction of the horizontal coordinate of each pixel of the stereoscopic image for the parallax scaling operation to adjust the parallax range of the stereoscopic image, such that the adjusted parallax range of the stereoscopic image falls into the desired parallax range of the stereoscopic display device.

Further, the second shifting unit 37 is configured to shift the horizontal coordinate of each pixel of the stereoscopic image by the second offset value and in the second offset direction.

Alternatively or optionally, when the overall parallax shifting operation is unconditional (i.e., without judging the first condition), the first judging unit 32 may be omitted. When the parallax scaling operation is conditional, a second judging unit (not shown) may be included.

Figure 10:
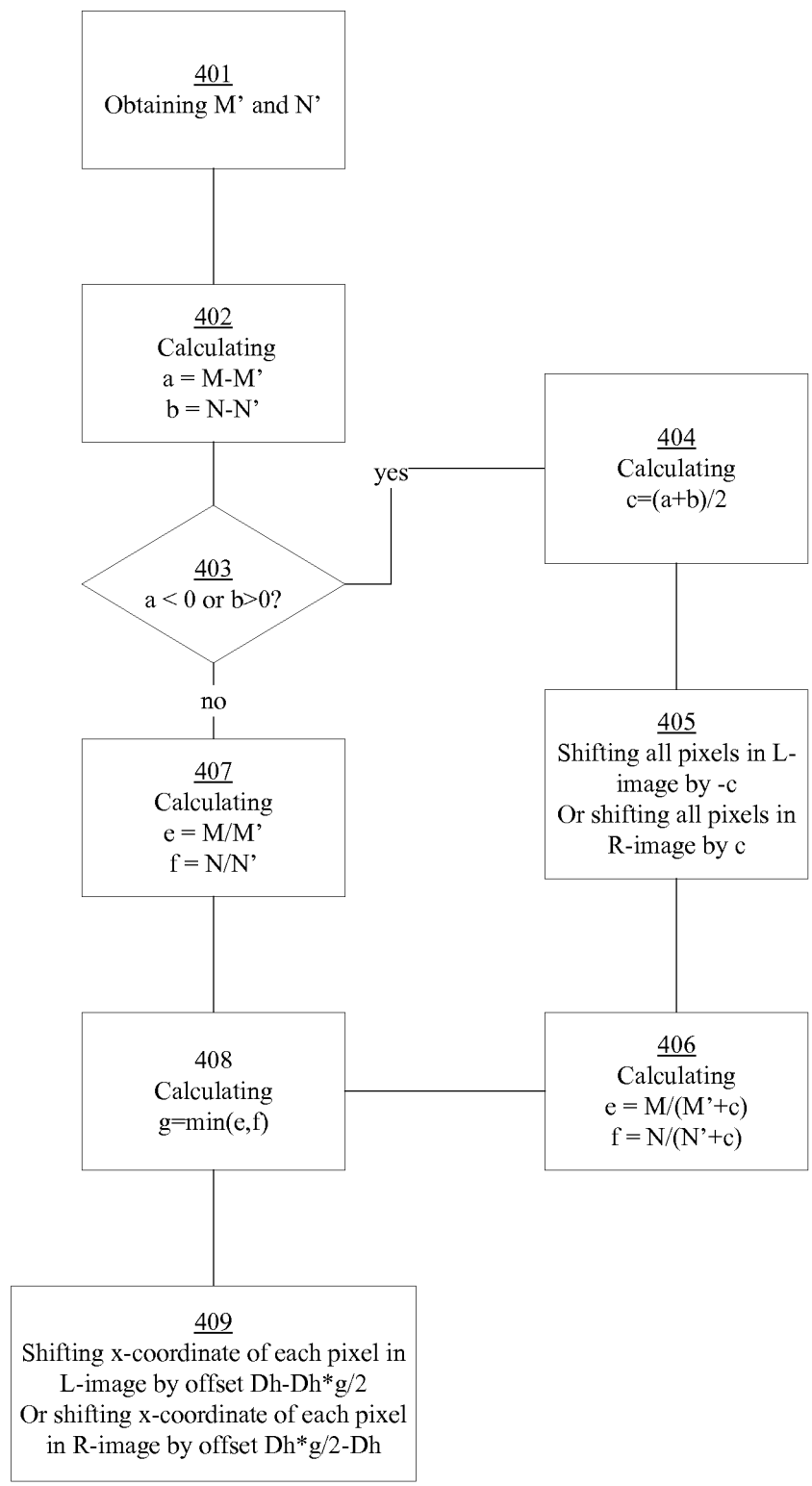
FIG. 10 illustrates an exemplary algorithm for the integrated image processing consistent with the disclosed embodiments.

FIG. 10 illustrates an exemplary corresponding algorithm for the integrated image processing consistent with the disclosed embodiments. As shown in FIG. 10, at the beginning, the maximum positive parallax and minimum negative parallax of the stereoscopic image, M' and N', are obtained (401).

Corresponding maximum positive parallax and minimum negative parallax of the stereoscopic display device, M and N, are also obtained.

Further, a=M−M' and b=N−N' are calculated (402), and it is determined whether a<0 or b>0 (i.e., whether the parallax range of the stereoscopic image exceeds the parallax range of the stereoscopic display device). If a<0 or b>0 is satisfied (402; yes), continuing to 404; if a<0 or b>0 is not satisfied (402; no), continuing to 407.

Further, the offset value c=(a+b)/2 is calculated (404). The offset value c may be used to align the center of the parallax range of the stereoscopic image with the center of the parallax range of the stereoscopic display device.

After calculating the offset value c, the horizontal coordinate of each pixel in the left image is added with −c (i.e., shifting to the left by c); or the horizontal coordinate of each pixel in the right image is added with c (i.e., shifting to the right by c) (405).

Further, in 406, the parameters e=M/(M'+c) and f=N/(N'+c) are calculated based on the updated parallax range, and the algorithm continues to 408. In 407, the parameters e=M/M' and f=N/N' are calculated based on the unadjusted parallax range.

The parameter g=min(e, f) is also calculated (408). The parameter g is related to the p-value described above, e.g., the parameter g is the minimum value of the ratios M/M' and N/N', while the p-value is the minimum value of the ratios $M_b$/M' and $N_b$/N'.

Finally, in 409, the horizontal coordinate of each pixel in the left image is shifted to the right by offset ($D_h$−$D_h$*g/2) or the horizontal coordinate of each pixel in the right image is shifted to the left by offset ($D_h$*g/2−$D_h$), wherein $D_h$ is the current parallax of a pixel.

As described with the various embodiments, the stereoscopic image processing is performed on a single stereoscopic image (e.g., a single frame of a stereoscopic video). That is, for each frame in the stereoscopic video, the parallax range of each frame or each stereoscopic image is obtained by, for example, determining the maximum positive parallax and the minimum negative parallax of each frame or each stereoscopic image.

Alternatively, the parallax range of a frame or stereoscopic image may be determined based a group of frames or stereoscopic images containing the frame or stereoscopic image. For example, the maximum positive parallax of any frame or stereoscopic image of a video clip may be determined as the largest value of maximum positive parallax of each frame or each stereoscopic image of the video clip. Similarly, the minimum negative parallax of any frame or stereoscopic image of the video clip may be determined as the smallest value of minimum negative parallax of each frame or each stereoscopic image of the video clip.

Further, although the offset value, as described, is calculated during operation or configured in the system, the user may choose to configure the offset value interactively via a user control device. For example, the user may configure the horizontal offset value as one of $X_{offset}$, p, and $X'_{offset}$. The user may be prompted to enter such configuration when the parallax range of the stereoscopic image exceeds the parallax range of the stereoscopic display device.

By using the disclosed systems and methods, a variety of improved stereoscopic image processing applications may be implemented. The parallax range of the stereoscopic image to be displayed can be dynamically adjusted, so that the stereoscopic image can be suitable for different stereoscopic display devices. That is, after obtaining the parallax range of the stereoscopic image, whether to adjust the parallax range of the stereoscopic image can be determined. Based on the obtained parallax range and the parallax characteristics of the stereoscopic display device, an offset value and an offset direction of the horizontal coordinate of each pixel of the stereoscopic image of each pixel can be determined. The horizontal coordinate of each pixel of the stereoscopic image of each pixel can then be shifted based on the offset direction and the offset value.

Those of ordinary skill in the art understand that the whole or part of the disclosed processes or algorithms can be completed by a program instructing relevant hardware, and the program can be stored on a computer-readable storage medium, such as a read only memory, a magnetic disk or optical disk, etc. Alternatively, the disclosed units, modules, and systems can be implemented in hardware, software, or a combination of hardware and software. Other advantageous applications, modifications, substitutions, improvements are also obvious to those skilled in the art.

What is claimed is:

1. A method for a three-dimensional (3D) image processing system including a stereoscopic display device, comprising:
   providing a stereoscopic image;
   obtaining a parallax range of the stereoscopic image and a parallax range supported by the stereoscopic display device;
   determining a parallax operation to adjust the parallax range of the stereoscopic image based on the relationship between the parallax range of the stereoscopic image and the parallax range supported by the stereoscopic display device;
   determining an offset value and an offset direction of a horizontal coordinate of each pixel of the stereoscopic image;
   shifting the horizontal coordinate of each pixel of the stereoscopic image by the offset value and in the offset direction;
   determining an updated parallax range of the stereoscopic image based on the shifted the horizontal coordinate of each pixel of the stereoscopic image;
   determining a parallax scaling factor based on the updated parallax range of the stereoscopic image and a desired parallax range of the stereoscopic display device;
   determining a second offset value and a second offset direction based on the parallax scaling factor such that a scaled parallax range of the stereoscopic image falls into the desired parallax range supported by the stereoscopic display device; and
   shifting the horizontal coordinate of each pixel of the stereoscopic image by the second offset value and in the second offset direction.

2. The method according to claim 1, wherein:
   the parallax operation is an overall parallax shifting operation; and
   the offset value and the offset direction are determined such that a distance between a center of the parallax range of the stereoscopic image and a center of the parallax range supported by the stereoscopic display device is decreased.

3. The method according to claim 1, wherein:
   the parallax operation is a parallax scaling operation.

4. The method according to claim 1, wherein determining the parallax operation to adjust the parallax range of the stereoscopic image further includes:
   determining whether a first condition is satisfied; and when the first condition is satisfied, determining the parallax operation to adjust the parallax range of the stereoscopic image,
wherein the first condition includes at least one of:
the parallax range of the stereoscopic image exceeds the parallax range supported by the stereoscopic display device; and
a distance between a center of the parallax range of the stereoscopic image and a center of the parallax range supported by the stereoscopic display device is decreased is greater than a predetermined threshold.

5. The method according to claim 1, wherein:
the parallax range of the stereoscopic image is determined as a range set by a maximum positive parallax of the stereoscopic image and a minimum negative parallax of the stereoscopic image.

6. The method according to claim 1, wherein:
the stereoscopic image is one of a plurality of stereoscopic images of a stereoscopic video clip; and
the parallax range of the stereoscopic image is determined as a range set by a maximum positive parallax of the plurality of stereoscopic images and a minimum negative parallax of the plurality of stereoscopic images.

7. The method according to claim 2, wherein:
provided that $k_1$ and $k_2$ represent a weight of positive parallax and a weight of negative parallax, respectively, M represents a maximum positive parallax supported by the stereoscopic display device, N represents a minimum negative parallax supported by the stereoscopic display device, M' represents a maximum positive parallax of the stereoscopic image, N' represents a minimum negative parallax of the stereoscopic image, and $k_1+k_2=1$,
the offset value $X_{offset}$ is determined by $X_{offset}=k_1(M-M')+k_2(N-N')$.

8. The method according to claim 3, wherein:
provided that $D_h$ represents parallax of each pixel, p represents a factor, M represents a maximum positive parallax supported by the stereoscopic display device, N represents a minimum negative parallax supported by the stereoscopic display device, $M_b$ represents a maximum positive parallax of the desired parallax range supported by the stereoscopic display device and $M/5 \leq M_b \leq M$, $N_b$ represents a minimum negative parallax of the desired parallax range supported by the stereoscopic display device and $N/5 \leq N_b \leq N$, M' represents a maximum positive parallax of the stereoscopic image, N' represents a minimum negative parallax of the stereoscopic image, and $p=\min(M_b/M', N_b/N')$,
the offset value $X'_{offset}$ is determined by $X'_{offset}=D_h \cdot (1-p)$.

9. The method according to claim 8, wherein determining the parallax operation to adjust the parallax range of the stereoscopic image further includes:
determining whether a second condition is satisfied; and
when the second condition is satisfied, determining the parallax operation to adjust the parallax range of the stereoscopic image,
wherein the second condition includes at least one of:
p is less than a predetermined minimum value $P_{min}$;
p is greater than a predetermined maximum value $P_{max}$; and
the parallax range of the stereoscopic image exceeds the parallax range supported by the stereoscopic display device.

10. A three-dimensional (3D) image processing system, comprising:
an image source configured to provide a stereoscopic image;
a stereoscopic display device;
an obtaining unit configured to obtain a parallax range of the stereoscopic image and a parallax range supported by the stereoscopic display device;
an offset parameter determining unit configured to, when a parallax operation is determined to adjust the parallax range of the stereoscopic image based on the relationship between the parallax range of the stereoscopic image and the parallax range supported by the stereoscopic display device, determine an offset value and an offset direction of a horizontal coordinate of each pixel of the stereoscopic image;
a shifting unit configured to shift the horizontal coordinate of each pixel of the stereoscopic image by the offset value and in the offset direction;
an updating unit configured to determine an updated parallax range of the stereoscopic image based on the shifted the horizontal coordinate of each pixel of the stereoscopic image;
a second offset parameter determining unit configured to determine a second offset value and a second offset direction using a parallax scaling factor based on the updated parallax range of the stereoscopic image and a desired parallax range of the stereoscopic display device, such that a scaled parallax range of the stereoscopic image falls into the desired parallax range supported by the stereoscopic display device; and
a second shifting unit configured to shift the horizontal coordinate of each pixel of the stereoscopic image by the second offset value and in the second offset direction.

11. The system according to claim 10, wherein:
the parallax operation is an overall parallax shifting operation; and
the offset parameter determining unit determines the offset value and the offset direction such that a distance between a center of the parallax range of the stereoscopic image and a center of the parallax range supported by the stereoscopic display device is decreased.

12. The system according to claim 10 wherein:
the parallax operation is a parallax scaling operation.

13. The system according to claim 10, further including:
a judging unit configured to determine whether a first condition is satisfied, wherein the first condition includes at least one of:
the parallax range of the stereoscopic image exceeds the parallax range supported by the stereoscopic display device; and
a distance between a center of the parallax range of the stereoscopic image and a center of the parallax range supported by the stereoscopic display device is decreased is greater than a predetermined threshold.

14. The system according to claim 10, wherein:
the parallax range of the stereoscopic image is determined as a range set by a maximum positive parallax of the stereoscopic image and a minimum negative parallax of the stereoscopic image.

15. The system according to claim 10, wherein:
the stereoscopic image is one of a plurality of stereoscopic images of a stereoscopic video clip; and
the parallax range of the stereoscopic image is determined as a range set by a maximum positive parallax of the plurality of stereoscopic images and a minimum negative parallax of the plurality of stereoscopic images.

16. The system according to claim 11, wherein:
provided that $k_1$ and $k_2$ represent a weight of positive parallax and a weight of negative parallax, respectively, M represents a maximum positive parallax supported by the stereoscopic display device, N represents a minimum negative parallax supported by the stereoscopic display device, M' represents a maximum positive parallax of the stereoscopic image, N' represents a minimum negative parallax of the stereoscopic image, and $k_1+k_2=1$, the offset parameter determining unit determines the offset value $X_{offset}$ determined by $X_{offset}=k_1(M-M')+k_2(N-N')$.

17. The system according to claim 12, wherein:

provided that $D_h$ represents parallax of each pixel, p represents a factor, M represents a maximum positive parallax supported by the stereoscopic display device, N represents a minimum negative parallax supported by the stereoscopic display device, $M_b$ represents a maximum positive parallax of the desired parallax range supported by the stereoscopic display device and $M/5 \leq M_b \leq M$, $N_b$ represents a minimum negative parallax of the desired parallax range supported by the stereoscopic display device and $N/5 \leq N_b \leq N$, M' represents a maximum positive parallax of the stereoscopic image, N' represents a minimum negative parallax of the stereoscopic image, and $p=\min(M_b/M', N_b/N')$, the offset parameter determining unit determines the offset value $X'_{offset}$ determined by $X'_{offset}=D_h \cdot (1-p)$.

18. The method according to claim 17, further including:

a second judging unit configured to determine whether a second condition is satisfied, wherein the second condition includes at least one of:

p is less than a predetermined minimum value $P_{min}$;

p is greater than a predetermined maximum value $P_{max}$; and the parallax range of the stereoscopic image exceeds the parallax range supported by the stereoscopic display device.

* * * * *